April 9, 1929.
J. WILLIAMS
1,708,816
PISTON RING
Filed Dec. 3, 1927
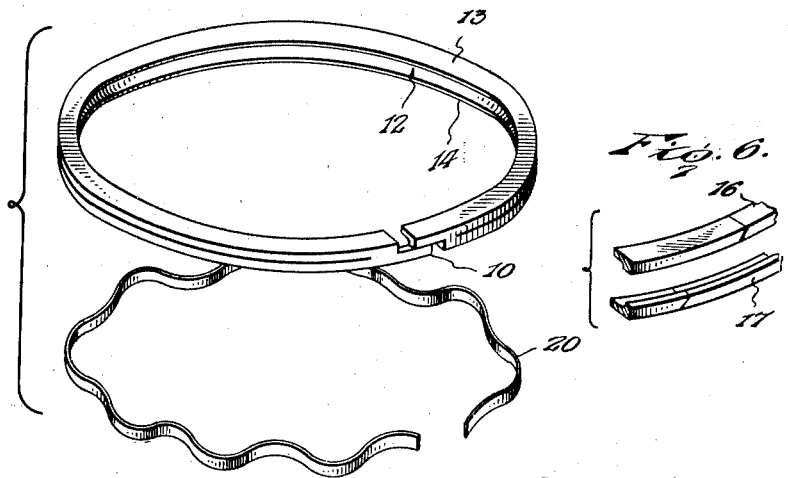
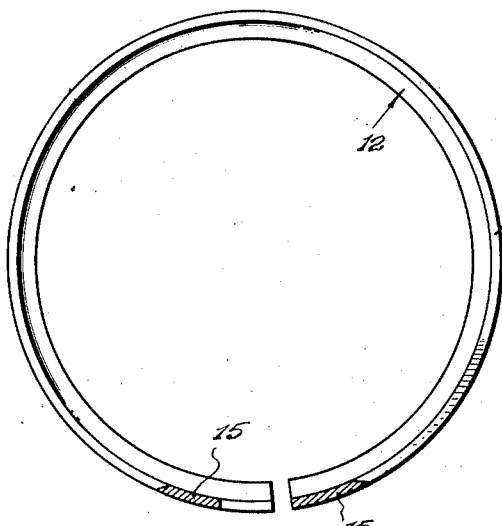
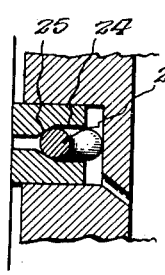
Inventor
Judson Williams.
By Lacey & Lacey, Attorneys Patented Apr. 9, 1929.

1,708,816

UNITED STATES PATENT OFFICE.

JUDSON WILLIAMS, OF PHILADELPHIA, PENNSYLVANIA.

PISTON RING.

Application filed December 3, 1927. Serial No. 237,451.

This invention relates to an improved piston ring and seeks to provide a ring having a central radial oil passage extending throughout the major portion of the circumference of the ring and serving, in effect, to form the ring into upper and lower sections which may be wedged apart for spreading the ring laterally and maintaining a sealed joint between the upper and lower faces of the ring and the top and bottom walls of the ring groove.

And the invention seeks, as a further object, to provide a ring wherein the expansion spring employed will not only tend to press the ring against the cylinder wall but will also serve to press the sections of the ring apart for spreading the ring laterally.

Other objects of the invention not specifically mentioned in the foregoing will appear during the course of the following description.

In the drawings,

Figure 1 is a perspective view of my improved ring,

Figure 2 is a horizontal sectional view taken medially through the ring,

Figure 3 is a fragmentary section showing the ring mounted in one of the ring grooves of a piston, Figure 4 is a sectional view similar to Figure 3 and showing a slight modification of the invention, Figure 5 is a fragmentary sectional view similar to Figure 4 and showing a further slight modification of the invention, and Figure 6 is a fragmentary perspective view showing a still further modification.

In carrying the invention into effect I employ an annular resilient ring body provided at its ends with an appropriate joint such as a lap joint, as indicated at 10, the ring possessing the required tension to expand against the cylinder wall. Formed in the ring body medially thereof is a radial slot 11 which may be provided by sawing through the ring either from its inner or outer circumference. As seen in Figure 2 the slot 11 extends throughout the major portion of the outer circumference of the ring body, terminating close to the ends thereof, and formed in the inner circumference of the ring body is an annular groove 12 which extends entirely throughout said inner circumference of the ring body.

As will be perceived, the slot 11 and groove 12 provide a medial radial oil passage through the ring body and this passage defines, in effect, the upper and lower ring sections 13 and 14 integrally connected near the ends of the ring body by short flexible webs 15. Thus, as will be appreciated, these sections may be spread laterally. In Figure 6 I have shown a modification of the invention wherein the ring body is formed of separate upper and lower sections 16 and 17.

The groove 12 is of a depth to extend throughout approximately half the width of the ring body and as shown in Figure 3, the confronting walls of the groove are preferably provided at their inner margins with curved portions 18 converging towards the slot 11. However, the ring body may, as shown in Figure 4, be provided at its inner circumference with a substantially V-shaped groove 19. Removably fitting in the groove 12 of the ring body is a split annular tensioning spring 20 which is preferably waved or corrugated.

In Figure 3, I have shown my improved ring in position in one of the ring grooves 21 of an engine piston 22, the piston being provided at the lower inner corner of the groove with suitably spaced drain passages one of which is indicated at 23. As will be seen, the ring will not only expand against the cylinder wall but the expansive action of the ring will be augmented by the tensioning spring 20 to constantly maintain a sealed joint between the ring and the cylinder wall. At the same time, the upper and lower edges of the tensioning spring 20 will coact with the curved portions 18 of the side walls of the groove 12 for wedging the sections 13 and 14 of the ring body apart and expanding the ring laterally so that the upper face of the ring will be held in tight contact with the top wall of the ring groove 21 while the lower face of the ring will likewise be held in tight contact with the bottom wall of the ring groove. Thus, to all intents and purposes sealed joints will be maintained between the upper and lower faces of the ring and the top and bottom walls of the ring groove. At the same time oil collected from the cylinder wall will be permitted to freely flow through the passage provided by the slot 11 and groove 12 so that the oil may enter the ring groove behind the ring and discharge through the passages 23 to the interior of the piston. Oil pumping will thus be reduced to a minimum. Like results will follow with the ring shown in Figure 4 since, as will be seen, the tensioning spring 20 will coact with the inclined faces of the groove 19 for expanding the ring laterally.

In Figure 5 I have illustrated a slight modification of the invention wherein the ring body is provided at its inner circumference with an annular groove 24 corresponding to the groove 12. The confronting walls of the groove 24 are provided at their inner margins with inclined portions 25 converging towards the slot in the outer periphery of the ring body, and removably fitting in the groove 24 is a split resilient tensioning spring 26 corresponding to the spring 20. The spring 20, as will be observed, is flat in cross-section whereas the spring 26 is circular in cross-section. However, the two springs function in the same manner. The spring 26 will, as will be seen, coact with the inclined portions 25 of the groove 24 for wedging the sections of the ring body apart and holding the upper and lower faces of the ring in tight contact with the top and bottom walls of the ring groove.

Having thus described the invention, what I claim is:

1. A piston ring including a ring body provided with a radial oil passage defining ring sections above and below the passage, the sections being connected at the ends of the ring and free throughout the remainder of its circumference and provided with cam surfaces, and a tensioning spring coacting with the cam surfaces of said sections for expanding the ring laterally and radially.

2. A piston ring including a ring body having separable ends and comprising yieldable upper and lower sections joined by portions of the ring at their ends, and a tensioning spring coacting with said sections for flexing the sections and expanding the ring laterally.

3. A piston ring including a ring body provided intermediate its depth with a radial slot opening through its outer circumferential face and about its inner circumference formed with an annular groove communicating with said slot to form a radial oil passage extending throughout the major portion of the length of the ring body, said passage defining upper and lower ring sections joined adjacent the ends of the rings and having inner surfaces diverging from each other, and a tensioning spring disposed in said groove and coacting with the diverging surfaces thereof for spreading said sections into engagement with upper and lower walls of a ring groove in a piston and expanding the ring laterally.

4. A piston ring comprising an annular body having separable ends and split circumferentially in a radial direction to provide upper and lower sections, the split terminating in spaced relation to the ends of the body to provide the body with end portions joining the ends of said sections, and a tensioning spring bearing against inner surfaces of the ring sections and cooperating therewith to flex the sections and expand the ring.

5. A piston ring comprising an annular body having separable ends and split circumferentially in a radial direction to provide upper and lower sections, the split terminating in spaced relation to the ends of the body to provide the body with end portions joining the ends of said sections, inner surfaces of the sections having portions extending in diverging relation to each other transversely of the ring to provide cam surfaces, and a tensioning spring bearing against the cam surfaces to flex the ring sections and expand the ring.

In testimony whereof I affix my signature.

JUDSON WILLIAMS.